(12) United States Patent
Line et al.

(10) Patent No.: US 12,077,066 B2
(45) Date of Patent: Sep. 3, 2024

(54) VEHICLE SEATING SYSTEM FOR A STATIONARY VEHICLE

(71) Applicant: Ford Global Technologies, LLC, Dearborn, MI (US)

(72) Inventors: Johnathan Andrew Line, Northville, MI (US); Robert Allen Bastuba, Jr., Macomb, MI (US); Collin Joshua Smith, Royal Oak, MI (US); Robert Charles Shipley, Westland, MI (US); Francisco Edgar Guizar Ramirez, Mexico City (MX); Scott Culver Anderson, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 17/699,755

(22) Filed: Mar. 21, 2022

(65) Prior Publication Data

US 2023/0294562 A1    Sep. 21, 2023

(51) Int. Cl.
*B60N 2/01* (2006.01)
*B60N 2/30* (2006.01)

(52) U.S. Cl.
CPC .......... *B60N 2/012* (2013.01); *B60N 2/3081* (2013.01)

(58) Field of Classification Search
CPC ................ A47C 9/06; A47B 5/04; A47B 5/06
USPC ............. 296/65.03, 65.05, 65.13, 64; 297/14
See application file for complete search history.

(56) References Cited

U.S. PATENT DOCUMENTS

| 3,600,033 | A | * | 8/1971 | Holdampf | A47C 1/032 |
| | | | | | 297/333 |
| 4,005,898 | A | * | 2/1977 | Way | B60P 3/423 |
| | | | | | 5/118 |
| 4,009,903 | A | * | 3/1977 | Manspeaker | A47C 4/06 |
| | | | | | 297/14 |
| 4,682,438 | A | * | 7/1987 | Arrow | B63B 29/04 |
| | | | | | 297/14 |
| 5,029,928 | A | | 7/1991 | Huber | |
| 5,078,443 | A | | 1/1992 | Austin | |

(Continued)

FOREIGN PATENT DOCUMENTS

CN     112315184 A  *  2/2021

OTHER PUBLICATIONS

U.S. Appl. No. 17/700,018, filed Mar. 21, 2022 Seating Solutions for a Stationary Vehicle.

(Continued)

*Primary Examiner* — Amy R Weisberg
*Assistant Examiner* — Veronica M Shull
(74) *Attorney, Agent, or Firm* — Vichit Chea; Price Heneveld LLP

(57) ABSTRACT

A vehicle seating system includes a support feature coupled to a sidewall within a cargo space of a vehicle. A seating assembly is coupled to the support feature. The seating assembly is rotatable between a stowed position and a deployed position. The seating assembly includes a seat base having a proximal end coupled to the support feature and a distal end. The distal end of the seat base is disposed adjacent to the sidewall in the stowed position. The seating assembly also includes a leg support coupled to the distal end of the seat base. The leg support is operable between a storage position and a support position.

20 Claims, 14 Drawing Sheets

(56) References Cited

U.S. PATENT DOCUMENTS

| | | | | |
|---|---|---|---|---|
| 5,139,301 | A * | 8/1992 | Lewis | B60N 2/3095 |
| | | | | 297/254 |
| 5,516,179 | A * | 5/1996 | Tidwell | B62D 33/0612 |
| | | | | 296/64 |
| 6,161,486 | A * | 12/2000 | Boots | B25H 1/04 |
| | | | | 297/14 |
| 6,364,391 | B1 * | 4/2002 | Everett | B60N 2/3095 |
| | | | | 296/57.1 |
| 6,672,662 | B1 | 1/2004 | Balk | |
| 6,729,685 | B1 * | 5/2004 | Ebalobor | A47C 9/06 |
| | | | | 297/14 |
| 6,932,408 | B1 * | 8/2005 | Lyod, Jr. | B60N 2/005 |
| | | | | 5/118 |
| 7,159,939 | B2 * | 1/2007 | Brown | B60N 2/01508 |
| | | | | 297/130 |
| 7,431,366 | B2 | 10/2008 | Sankrithi et al. | |
| 8,528,976 | B2 | 9/2013 | Wimberley | |
| 9,199,553 | B2 | 12/2015 | Cuddihy et al. | |
| 9,340,126 | B2 | 5/2016 | Cuddihy et al. | |
| 9,393,887 | B1 * | 7/2016 | Beis | B60N 2/015 |
| 9,878,675 | B2 * | 1/2018 | George | F16M 13/02 |
| 10,081,272 | B2 | 9/2018 | De Saulles | |
| 10,500,993 | B2 * | 12/2019 | Yacob | B60N 2/3095 |
| 2004/0113451 | A1 * | 6/2004 | Szymanski | B60N 2/01516 |
| | | | | 296/65.05 |
| 2008/0246298 | A1 | 10/2008 | Leigh-Monstevens | |
| 2018/0229631 | A1 | 8/2018 | Yacob | |
| 2019/0219081 | A1 * | 7/2019 | Hagedorn | F16B 37/14 |
| 2020/0139860 | A1 * | 5/2020 | Sakurai | B60N 2/242 |
| 2020/0290484 | A1 | 9/2020 | Line et al. | |
| 2020/0376986 | A1 | 12/2020 | Line et al. | |
| 2021/0229572 | A1 | 7/2021 | Line et al. | |
| 2021/0229580 | A1 | 7/2021 | Waters-Banks | |

OTHER PUBLICATIONS

U.S. Appl. No. 17/699,952, filed Mar. 21, 2022, Seat-Mounted Work Surface.

U.S. Appl. No. 17/700,057, filed Mar. 21, 2022, Seating Solutions for a Stationary Vehicle.

U.S. Appl. No. 17/700,081, filed Mar. 21, 2022, Seating Solutions for a Stationary Vehicle.

U.S. Appl. No. 17/699,981, filed Mar. 21, 2022, Seating Solutions for a Vehicle.

U.S. Appl. No. 17/699,781, filed Mar. 21, 2022, Vehicle Seating System for a Stationary Vehicle.

U.S. Appl. No. 17/699,996, filed Mar. 21, 2022, Seating Assembly with Swivel Capability.

U.S. Appl. No. 17/700,007, filed Mar. 21, 2022, Vehicle Floor Panel.

* cited by examiner

VEHICLE SEATING SYSTEM FOR A STATIONARY VEHICLE

FIELD OF THE DISCLOSURE

The present disclosure generally relates to a seating system, and more particularly, to a seating system for a stationary vehicle.

BACKGROUND OF THE DISCLOSURE

Vehicles often include seats within a passenger cabin. The seats are often adjustable between different configurations. The different configurations may include an upright position to support a person thereon and a lowered position to increase storage space. While all modern Original Equipment Manufacturers (OEMs) of passenger vehicles currently warn occupants against sitting in the bed of a pickup truck while the vehicle is moving due to safety concerns, it is anticipated that technology and the regulatory framework may evolve in the future to where such an activity is safe and permissible.

SUMMARY OF THE DISCLOSURE

According to at least one aspect of the present disclosure, a vehicle includes a body defining a cargo space. The body includes at least one sidewall that partially defines the cargo space. Support features are coupled to the at least one sidewall. Seating assemblies are coupled to the support features in the cargo space. Each of the seating assemblies includes a seat base operable between a stowed position and a deployed position. A bottom surface of the seat base is disposed adjacent to the at least one sidewall when the seat base is in the stowed position. Each of the seating assemblies also includes a leg support operably coupled to the seat base. The leg support is operable between a storage position and a support position. An end of the leg support is disposed proximate to the seat base when in the storage position and configured to engage a floor of the cargo space when in the support position.

According to another aspect of the present disclosure, a seating system for a vehicle includes a sidewall at least partially defining a cargo space. The sidewall defines a wheel housing. A first support feature is coupled to the sidewall on a first side of the wheel housing. A second support feature is coupled to the sidewall on a second side of the wheel housing. A first seating assembly is selectively coupled to the first support feature. A second seating assembly is selectively coupled to the second support feature. Each of the first seating assembly and the second seating assembly includes a seat base rotatable between a stowed position and a deployed position. The seat bases extend along a surface of the sidewall when in the stowed position. Each of the first seating assembly and the second seating assembly also includes a leg support coupled to the seat base. The leg supports are operable between a storage position and a support position.

According to another aspect of the present disclosure, a vehicle seating system includes a support feature coupled to a sidewall within a cargo space of a vehicle. A seating assembly is coupled to the support feature. The seating assembly is rotatable between a stowed position and a deployed position. The seating assembly includes a seat base having a proximal end coupled to the support feature and a distal end. The distal end of the seat base is disposed adjacent to the sidewall in the stowed position. The seating assembly also includes a leg support coupled to the distal end of the seat base. The leg support is operable between a storage position and a support position.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
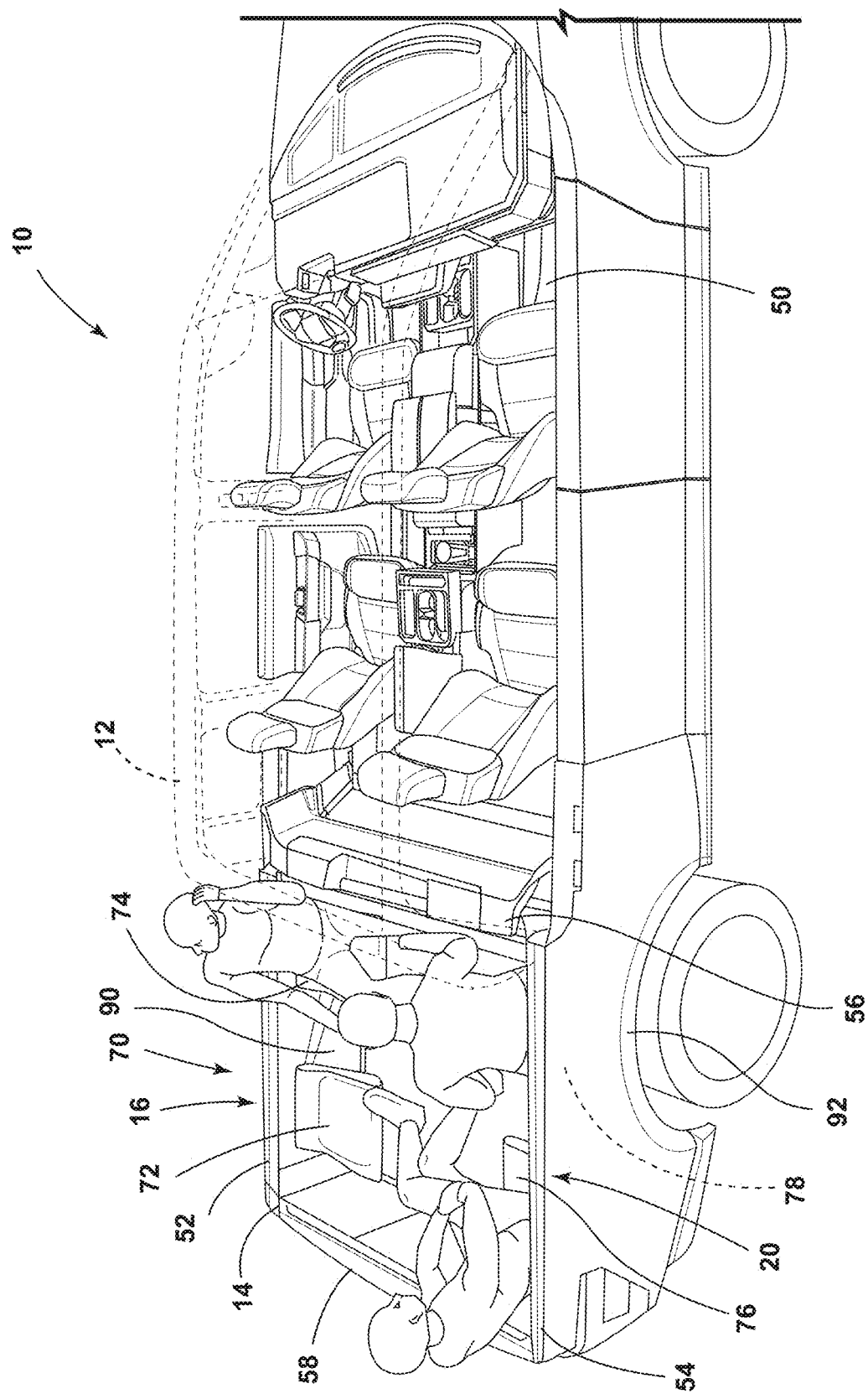
FIG. 1 is a side perspective view of a vehicle with a seating system in a cargo space for use when the vehicle is in a stationary state, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-14, reference numeral 10 generally designates a vehicle 10 that includes a body 12 defining a cargo space 14. The body 12 includes at least one sidewall 16 at least partially defining the cargo space 14. Support features 18 are coupled to the at least one sidewall 16. Seating assemblies 20 are coupled to the support features 18 in the cargo space 14, which are generally configured to be used when the vehicle 10 is stationary or in a non-moving state. Each of the seating assemblies 20 includes a seat base 22 operable between a stowed position 24 and a deployed position 26. A bottom surface 28 of the seat base 22 is disposed adjacent to the at least one sidewall 16 when the seat base 22 is in the stowed position 24. Each of the seating assemblies 20 also includes a leg support 30 operably coupled to the seat base 22. The leg support 30 is operable between a storage position 32 and a support position 34. An end 36 of the leg support 30 is disposed proximate to the at least one sidewall 16 when in the storage position 32 and configured to engage a floor 38 of the cargo space 14 when in the support position 34.

Referring to FIG. 1, the vehicle 10 includes the body 12, which typically defines a passenger compartment 50 and the cargo space 14. The passenger compartment 50 and the cargo space 14 in the illustrated example are separated by the body 12 but may be part of the same area within the vehicle 10 without departing from the teachings herein. The vehicle 10 is illustrated as a truck, which has at least one seating row of interior seats within the passenger compartment 50, as well as the exterior cargo space 14 separate from the passenger compartment 50. The cargo space 14 is configured as a truck bed at least partially defined by the at least one sidewall 16.

The at least one sidewall 16 includes a first sidewall 52 and a second opposing sidewall 54, which are collectively referred to herein as the sidewalls 16. A cabin wall 56 that at least partially defines the passenger compartment 50 extends between vehicle-forward edges of the first sidewall 52 and the second sidewall 54, and a tailgate 58 extends between vehicle-rearward edges of the first and second sidewalls 52, 54. The tailgate 58 is generally operable between a raised position for at least partially enclosing the cargo space 14 and a lowered position for providing increased access to the cargo space 14.

Referring still to FIG. 1, the vehicle 10 includes a seating system 70 disposed within the cargo space 14. While all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible. Accordingly, the seating system 70 may be utilized in accordance with current safety and regulatory framework. The seating system 70 provides flexible and adjustable seating arrangements and configurations within the cargo space 14 of the vehicle 10. In the truck illustrated in FIG. 1, the seating system 70 provides an exterior seating experience in addition to the interior seating arrangements within the passenger compartment 50. In the exemplary configuration in FIG. 1, the seating system 70 includes four seating assemblies 20. First and second seating assemblies 72, 74 are coupled to the first sidewall 52 and third and fourth seating assemblies 76, 78 are coupled to the second sidewall 54. The first, second, third, and fourth seating assemblies 72, 74, 76, 78 are collectively referred to herein as the seating assemblies 20.

The seating system 70 provides a variety of seating arrangements that may be referred to as social arrangements, conferencing arrangements, remote office arrangements, etc. These arrangements are generally intended for use when the vehicle 10 is in a stationary, non-moving state (e.g., when the vehicle 10 is parked). Currently, all modern OEMs of passenger vehicles 10 warn occupants against sitting in the bed of a pickup truck while the vehicle 10 is moving due to safety concerns. OEMs that warn against sitting in the truck bed may consider and/or implement lockout technology to prevent the use of the seating system 70 in the truck bed while the vehicle 10 is moving. However, it is anticipated that technology and the regulatory framework may evolve in the future to where such an activity is safe and permissible.

The first sidewall 52 defines a first wheel housing 90, and the second sidewall 54 defines a second wheel housing 92. Generally, the first and second seating assemblies 72, 74 are disposed on opposing sides of the first wheel housing 90, while the third and fourth seating assemblies 76, 78 are disposed on opposing sides of the second wheel housing 92. Depending on the size of the cargo space 14, the size of the passenger compartment 50, and the configuration of the vehicle 10, one or more of the seating assemblies 20 may be disposed adjacent to the respective wheel housing 90, 92 without extending over the wheel housings 90, 92. Alternatively, one or more of the seating assemblies 20 may extend at least partially over the respective wheel housing 90, 92.

Though illustrated in FIG. 1 as a truck, the seating system 70 may be utilized in additional styles of vehicle 10 without departing the teachings herein. When used in other styles of vehicles 10, the use of the seating system 70 may align with the current OEM warnings, technology, and regulatory framework. The vehicle 10 may be a manually operated vehicle 10 (e.g., with a human driver), a fully autonomous vehicle 10 (e.g., with no human driver), or a partially autonomous vehicle 10 (e.g., operated with or without a human driver) that includes the seating system 70 to be used while the vehicle 10 is stationary, parked, or otherwise in a non-moving state. Separate from the seating system 70, the vehicle 10 may also be utilized for personal and/or commercial purposes, such as, for example, ride-providing services (e.g., chauffeuring), ridesharing services, and delivery or transport services.

Figure 2:
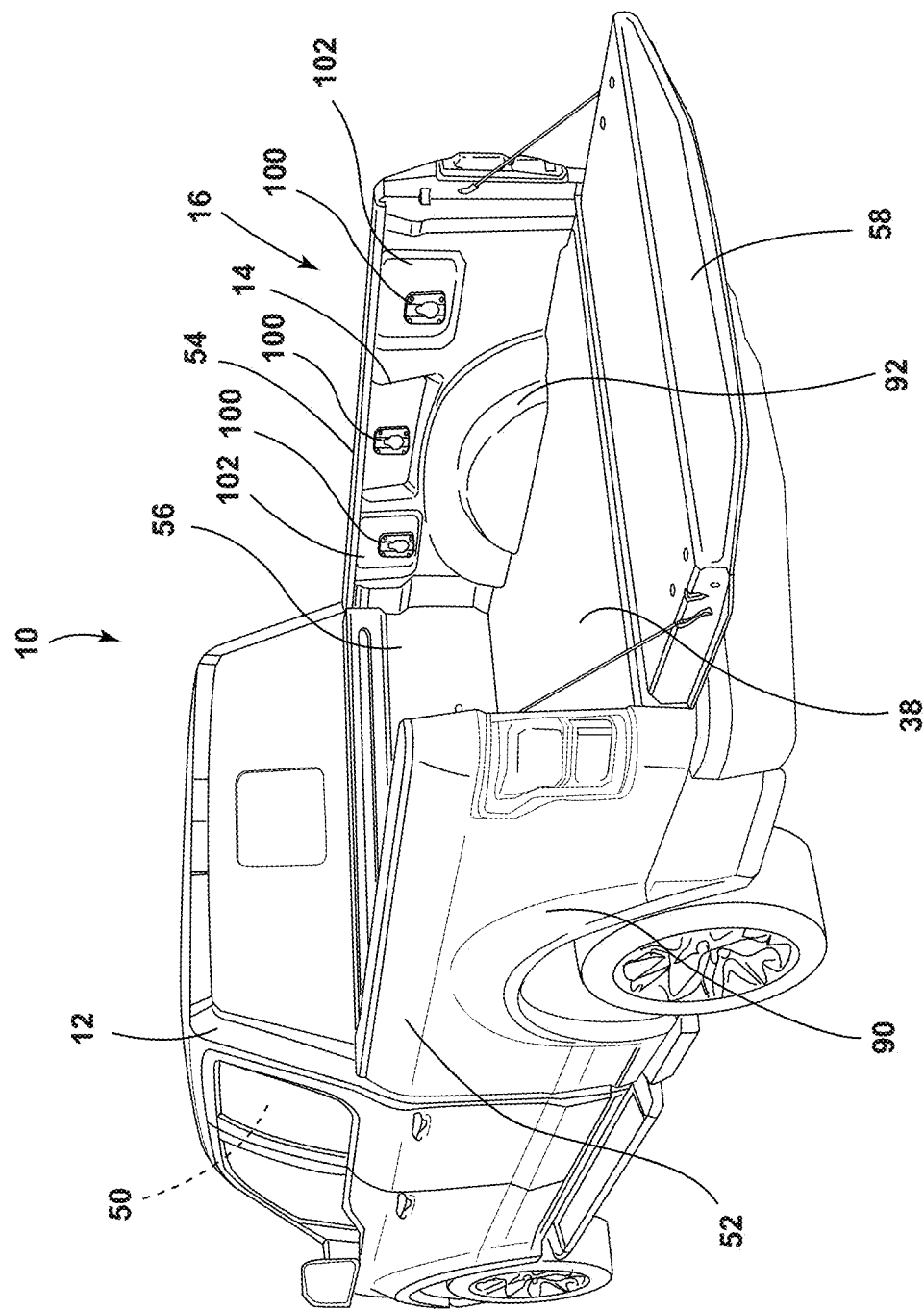
FIG. 2 is a rear perspective view of a cargo space within a vehicle that includes mounting brackets on sidewalls of the vehicle, according to the present disclosure.
Figure 3:
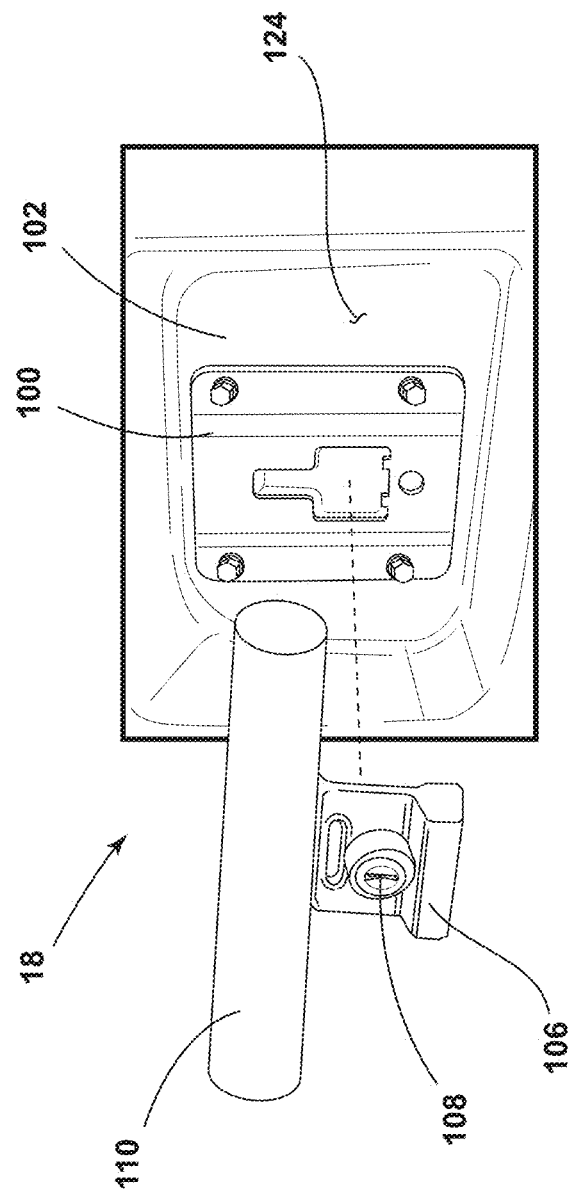
FIG. 3 is an exploded side perspective view of a support feature configured to engage a mounting bracket on a sidewall of a vehicle, according to the present disclosure.

Referring to FIGS. 2 and 3, the vehicle 10 includes mounting brackets 100 that are coupled to the first and second sidewalls 52, 54. For example, as illustrated in FIG. 2, the second sidewall 54 is illustrated with three mounting brackets 100. Though not illustrated, the first sidewall 52 is configured the same or as a mirror image of the second sidewall 54. The second sidewall 54 is illustrated with one mounting bracket 100 on each side of the second wheel housing 92 and one above the wheel housing 92. The mounting brackets 100 are each disposed within a recessed region 102, though other configurations of the engagement between the second sidewall 54 and the mounting brackets 100 are contemplated without departing from the teachings herein. Further, the vehicle 10 may include additional or fewer mounting brackets 100 without departing from the teachings herein.

Referring still to FIG. 3, one of the mounting brackets 100 coupled to one of the sidewalls 16 is illustrated. The mounting bracket 100 provides a universal or common mounting point for interchangeable accessories for the vehicle 10. For example, an exemplary support feature 18 that engages the mounting bracket 100 and one of the seating assemblies 20 (FIG. 1) is shown in relation to the mounting bracket 100. The support feature 18 includes a mounting portion 106 configured to interlock with the mounting bracket 100. The mounting portion 106 also includes a lock 108 for securing the mounting portion 106 to the mounting bracket 100. The illustrated support feature 18 includes a support bar 110 coupled to the mounting portion 106. The support bar 110 is configured to engage with the respective seating assembly 20 (FIG. 1). The support bar 110 generally extends in the fore-aft direction within the cargo space 14. Additional or alternative configurations of the support feature 18 may be utilized without departing from the teachings herein.

Referring again to FIG. 1 and still to FIG. 3, in various aspects, each seating assembly 20 engages a separate support feature 18. Alternatively, the seating assemblies 20 coupled to the same sidewall 52, 54 (e.g., the first and second seating assemblies 72, 74 or the third and fourth seating assemblies 76, 78) may be configured to couple with a single support feature 18. In such examples, the support feature 18 may include a support beam with multiple mounting portions 106 to engage multiple mounting brackets 100. In this way, the support beam extends in the fore-aft direction along respective of sidewall 52, 54 and engages multiple seating assemblies 20.

The support feature 18 may be separate from the seating assembly 20. In such examples, the support feature 18 is configured to selectively couple with the seating assembly 20 to couple the seating assembly 20 to the respective sidewall 16. Alternatively, the seating assemblies 20 may be permanently coupled with the seating assembly 20, such that the support feature 18 is part of the seating assembly 20 (i.e., a single unit). In such examples, the engagement of the support feature 18 to the mounting bracket 100 automatically couples the seating assembly 20 to the respective sidewall 16.

Figure 4:
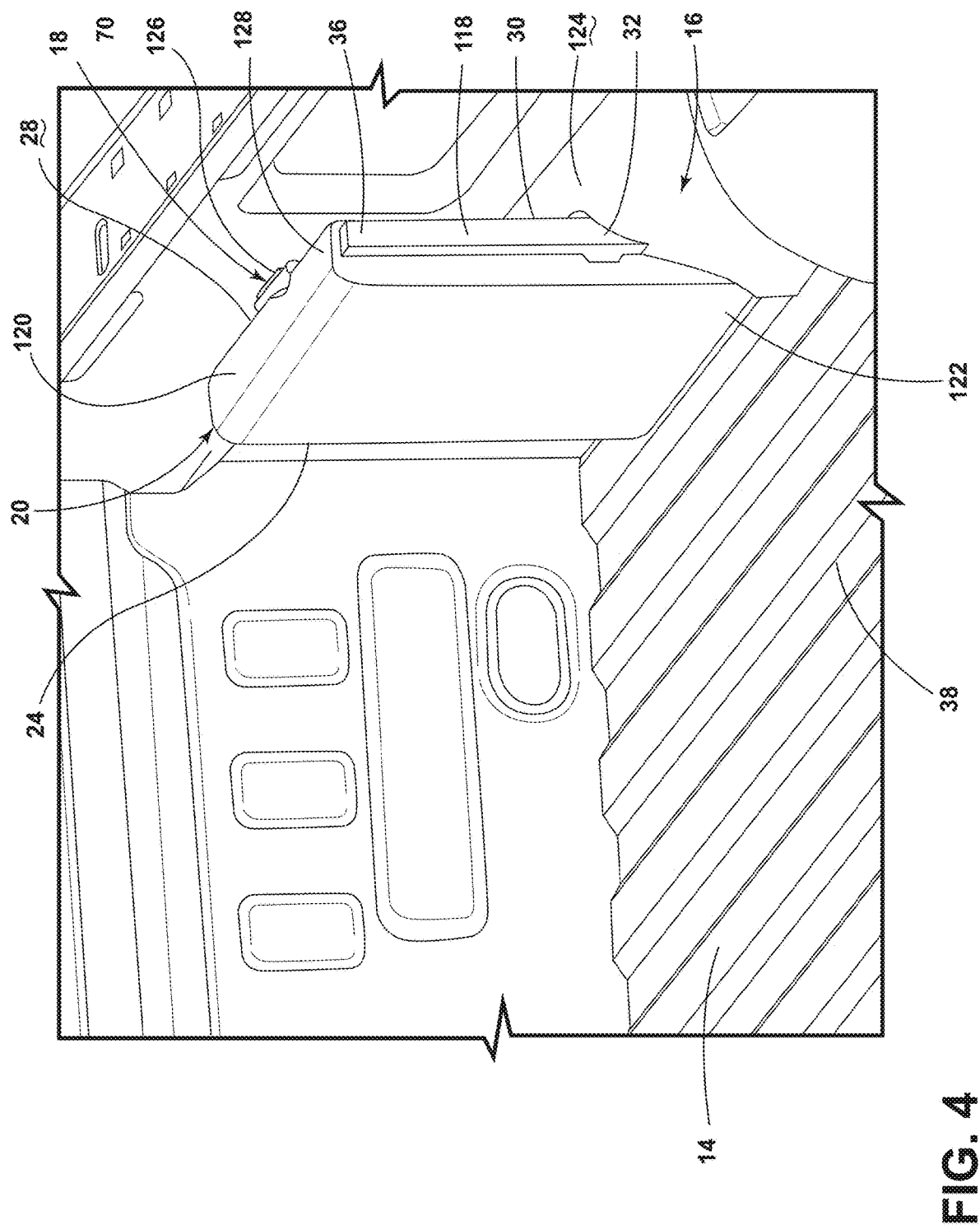
FIG. 4 is a side perspective view of a seating assembly of a vehicle seating system within a cargo space for use when the vehicle is in a stationary state, where a seat base is in a stowed position, according to the present disclosure.
Figure 5:
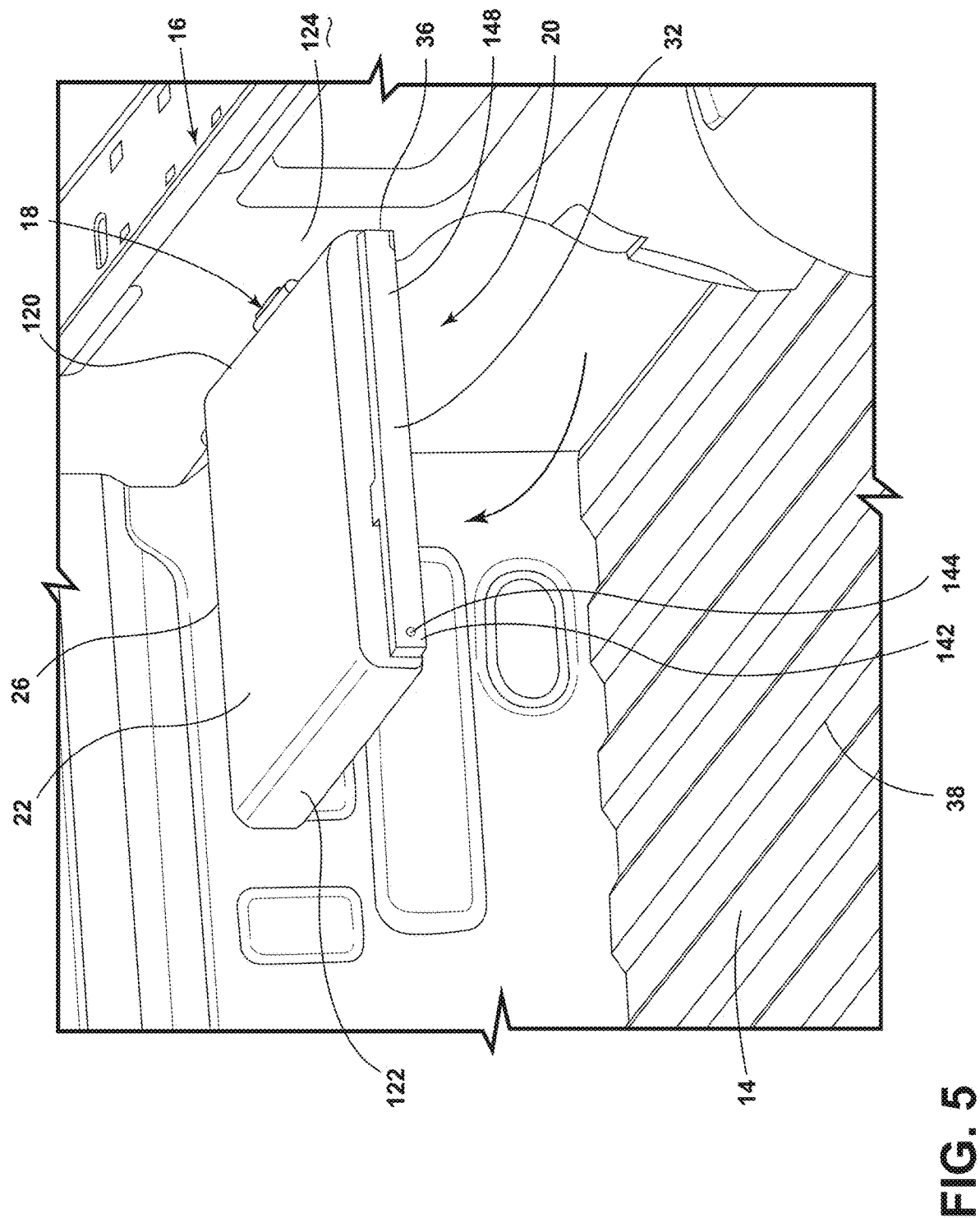
FIG. 5 is a side perspective view of a seating assembly of a vehicle seating system within a cargo space for use when the vehicle is in a stationary state, where a seat base is in a deployed position and a leg support is in a storage position, according to the present disclosure.
Figure 6:
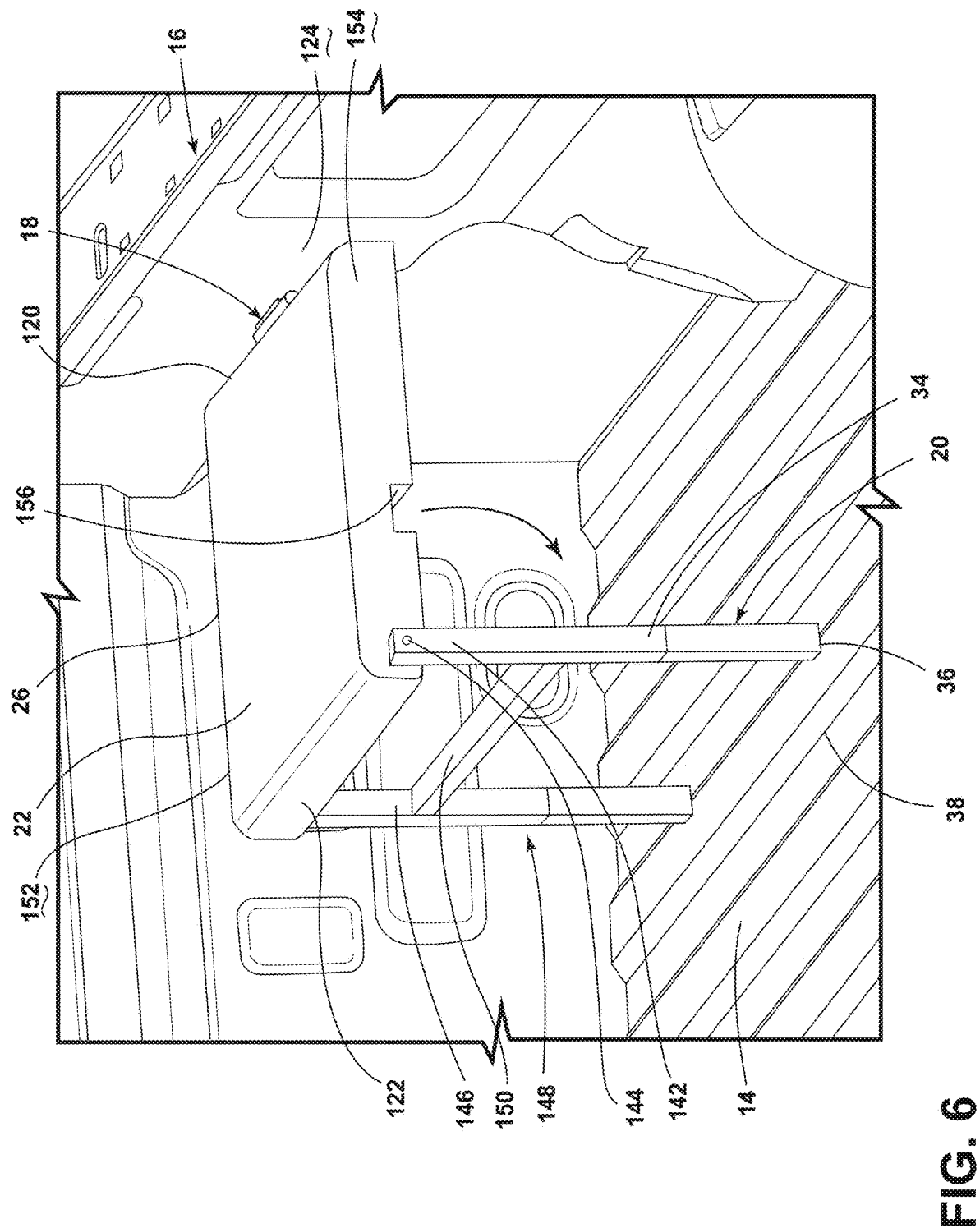
FIG. 6 is a side perspective view of a seating assembly of a vehicle seating system within a cargo space for use when the vehicle is in a stationary state, where a seat base is in a deployed position and a leg support is in a support position, according to the present disclosure.

Referring to FIGS. 4-6, one of the seating assemblies 20 is illustrated being coupled to the sidewall 16 for use in accordance with the current OEM warnings, technology, and regulatory framework. Each of the seating assemblies 20 may engage the respective sidewall 16 in a similar manner and have a similar configuration as described herein. The seating assembly 20 includes the seat base 22 with a proximal end 120 coupled to the sidewall 16 and a distal end 122 configured to move relative to the sidewall 16 based on the position of the seat base 22.

The seat base 22 is configured to rotate between the stowed position 24 and the deployed position 26. When in the stowed position 24, the bottom surface 28 of the seat base 22 is disposed adjacent to and extends along an inner surface 124 of the sidewall 16. Accordingly, both the proximal end 120 and the distal end 122 are disposed adjacent to the inner surface 124, and the seat base 22 is disposed generally parallel to the sidewall 16.

As the seat base 22 rotates from the stowed position 24 to the deployed position 26, the distal end 122 of the seat base 22 is configured to move from adjacent to the sidewall 16 and the floor 38 of the cargo space 14 to being generally horizontally aligned with the proximal end 120 of the seat base 22. In this way, when in the deployed position 26, the distal end 122 is spaced from the inner surface 124. The seat base 22 is configured to extend generally perpendicular to the inner surface 124 of the sidewall 16. In the stowed position 24, the seating assembly 20 is more compact and provides additional storage in the cargo space 14. When in the deployed position 26, the seating assembly 20 provides an exterior seating space for a user or a passenger. While all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible.

A coupling feature 126 or coupling features 126 are coupled to the proximal end 120 of the seat base 22. The coupling features 126 may be configured for selectively engaging and disengaging the seat base 22 from the support feature 18. The coupling features 126 may be hooks, C-shaped clips, snap features, D-rings, etc. In additional non-limiting examples, the support feature 18 may have mating structures configured to mate with the coupling features 126 to couple the support feature 18 to the seat base 22. Additionally or alternatively, when the seat base 22 and the support feature 18 are part of a single unit, the coupling features 126 may be rings that extend about an inner shaft of the support feature 18, D-shaped caps that engage ends of the support feature 18, etc. In such examples, the coupling features 126 may not be configured to disengage from the support feature 18.

At least one of the seat base 22, the support feature 18, and the coupling features 126 includes a locking or latching member 128 for retaining the seat base 22 in the deployed position 26. The latching member 128 may be able to support some or all the weight of a person seated on the seat base 22. In such examples, the latching member 128 may retain the seat base 22 in the deployed position 26 for supporting the person. Alternatively, the latching member 128 may not support the weight of the person but may be utilized to retain the seat base 22 in the deployed position 26 while allowing the user to adjust the leg support 30 to the support position 34. Currently, all modern OEMs of passenger vehicles 10 currently warn occupants against sitting in the bed of a pickup truck while the vehicle 10 is moving due to safety concerns. OEMs that warn occupants of this use may consider and/or implement lockout technology to prevent use of the seating system 70 while the vehicle is moving. However, it is also anticipated that technology and the regulatory framework may evolve in the future to where such an activity of sitting in the bed of a pickup truck while the vehicle 10 is moving is safe and permissible.

Referring still to FIGS. 4-6, the leg support 30 is coupled to the seat base 22. The leg support 30 includes the end 36, which is generally the first end 36, and a second end 142. As best illustrated in FIG. 4, when the seat base 22 is in the stowed position 24 and the leg support 30 is in the storage position 32, the leg support 30 is disposed adjacent to the inner surface 124 of the sidewall 16. Accordingly, both ends 36, 142 are disposed adjacent to the sidewall 16. In various aspects, at least a portion of the leg support 30 extends between the seat base 22 and the sidewall 16.

As best illustrated in FIG. 5, when the seat base 22 is in the deployed position 26 and the leg support 30 is in the storage position 32, the first end 36 is disposed proximate to the distal end 122 of the seat base 22, while the second end 142 is disposed proximate to the sidewall 16. At least one of the leg support 30 and the seat base 22 may include a retaining feature 144 configured to retain the leg support 30 in the storage position 32. This may be advantageous to reduce or prevent movement of the leg support 30 as the seat base 22 is being rotated.

Figure 7:
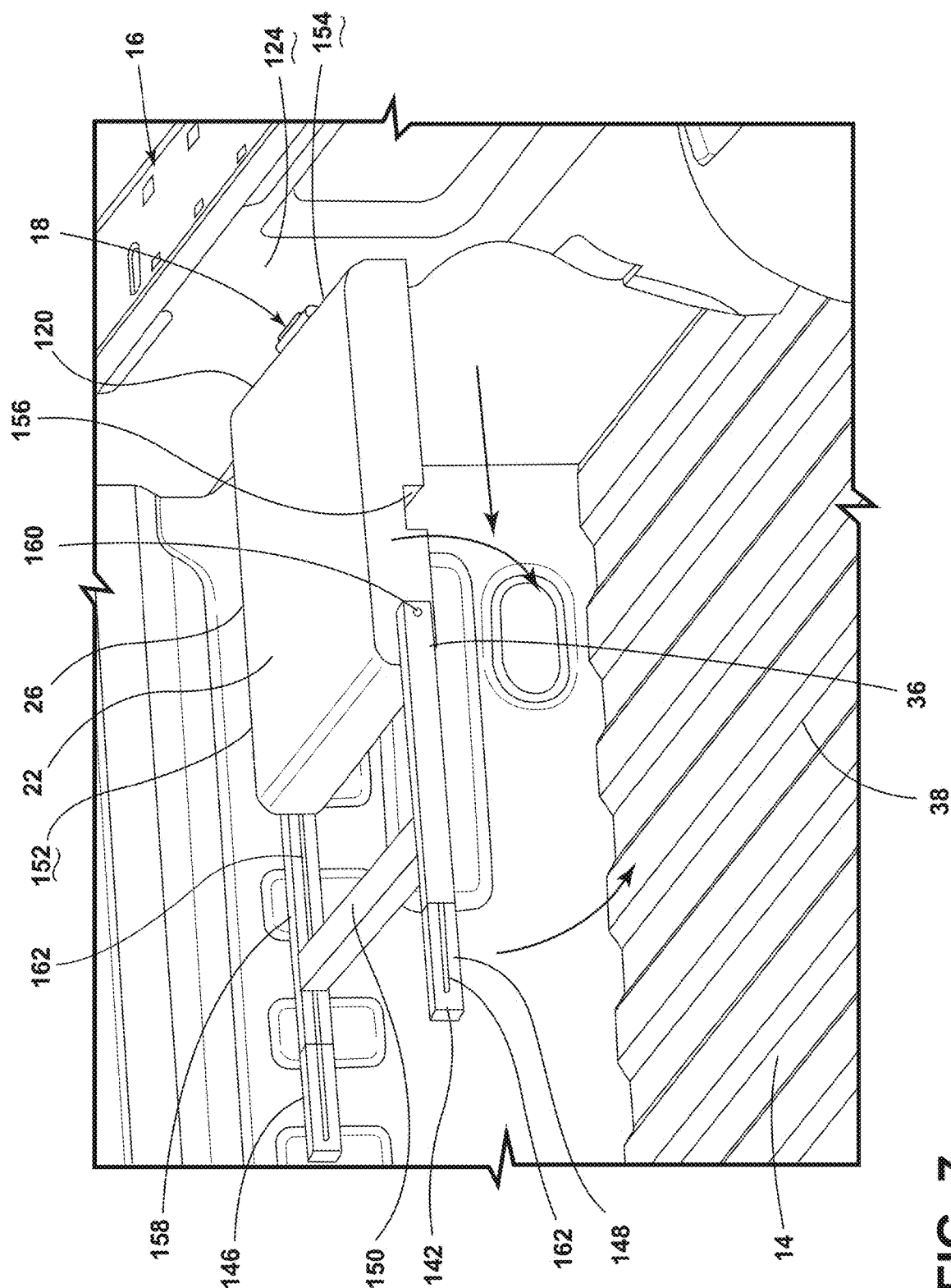
FIG. 7 is a side perspective view of a seating assembly of a vehicle seating system within a cargo space for use when the vehicle is in a stationary state, where a seat base is in a deployed position and a leg support is in an intermediate position, according to the present disclosure.

The leg support 30 generally includes two leg portions 146, 148, which are spaced on opposing sides of the seat base 22 and are arranged parallel to one another. The leg portions 146, 148 are generally coupled via a connector 150. The connector 150 may be a single bar, as best illustrated in FIG. 7, or may be multiple bars that are parallel, intersecting, or otherwise arranged relative to one another. When the leg support 30 is in the storage position 32, the leg portions 146, 148 are arranged adjacent to or abutting opposing side surfaces 152, 154 of the seat base 22. The bottom surface 28 of the seat base 22 generally defines a channel 156 that extends from one side surface 152 to the opposing side surface 154. The connector 150 is configured to be disposed within the channel 156 when the leg support 30 is in the storage position 32. This configuration provides for a more compact storing arrangement of the leg support 30.

In the example illustrated in FIGS. 5-7, the first end 36 of the leg support 30 is rotatably coupled to the distal end 122 of the seat base 22. The second end 142 of the leg support 30 rotates approximately 90° from adjacent to the proximal end 120 and the sidewall 16 adjacent to the floor 38 of the cargo space 14. The retaining feature 144, or a separate feature, may then lock or retain the leg support 30 in the support position 34. As best illustrated in FIG. 6, when the seat base 22 is in the deployed position 26 and the leg support 30 is in the support position 34, the seating assembly 20 includes the seating space for supporting the person thereon. While all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible.

Referring still to FIGS. 6 and 7, in various examples, the leg support 30 may be operable between the storage position 32, an intermediate position 158, and the support position 34. The leg support 30 may be configured to slide relative to the seat base 22 from the storage position 32 to the intermediate position 158. In certain aspects, the seat base 22 includes pins 160 that engage channels or slots 162 of the leg portions 146, 148 of the leg support 30. In alternative examples, the leg portions 146, 148 of the leg support 30 include the pins 160 that engage the channels or slots 162 in the side surfaces 152, 154 of the seat base 22. The leg support 30 is configured to slide away from the first sidewall 52 in a movement path that is generally parallel with the seat base 22 until the second end 142 of the leg support 30 is adjacent to the distal end 122 of the seat base 22. In this way, the leg support 30 forms an extension of the seat base 22. The second end 142 of the leg support 30 is rotatably coupled to the seat base 22, and the first end 36 of the leg support 30 is configured to rotate about 90° to engage the floor 38 of the cargo space 14.

Figure 8:
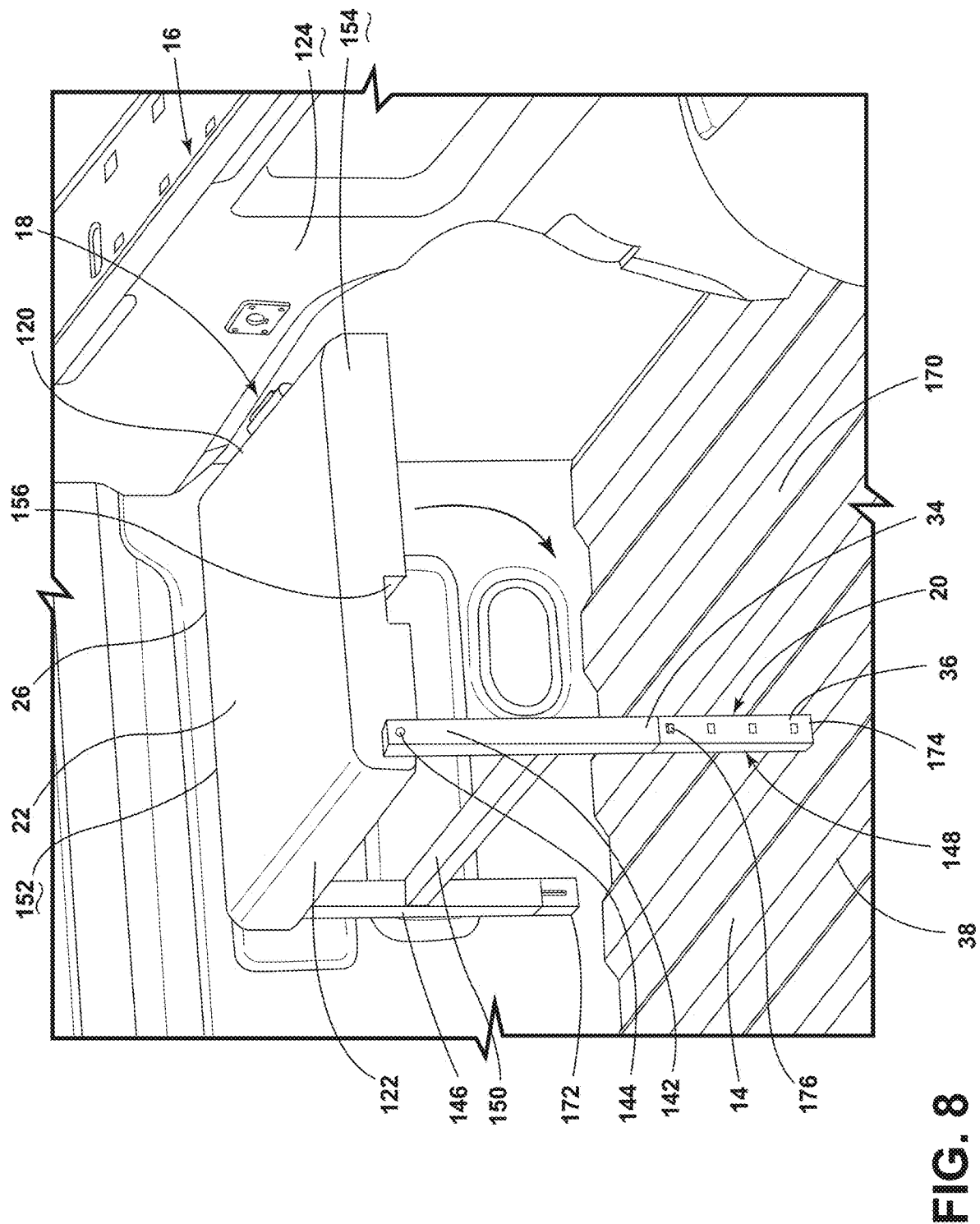
FIG. 8 is a side perspective view of a seating assembly of a vehicle seating system for use when the vehicle is in a stationary state, where a leg support includes a first leg portion in a nested position and a second leg portion in an extended position, according to the present disclosure.

Referring to FIG. 8, a height or length of the leg support 30 may be adjustable. In this way, the leg support 30 may be adjusted to change the positioning of the seat base 22 relative to the sidewall 16 (e.g., the angle at which the seat base 22 extends). The change in the seat base 22 position may be advantageous for increasing the comfort of the person on the seating assembly 20. Additionally or alternatively, if there are items on the floor 38 of the cargo space 14 or the floor 38 is uneven, such as having ribs 170 as illustrated in FIG. 8, the legs may be configured to adjust to provide increased stability for the seating assembly 20. All modern OEMs of passenger vehicles 10 currently warn occupants against sitting in the bed of a pickup truck while the vehicle 10 is moving due to safety concerns. However, it is anticipated that technology and the regulatory framework may evolve in the future to where such an activity is safe and permissible.

In certain aspects, the leg support 30 is configured to telescope between a nested or retracted position 172 and an extended position 174. Each leg portion 146, 148 may be separately adjustable, as illustrated in FIG. 8, or alternatively, the leg portions 146, 148 may be adjustable as a unit above and/or below the connector 150. It is also contemplated that the connector 150 may be selectively engaged and disengaged from the leg portions 146, 148 to provide additional adjustability to the leg support 30.

In examples where the leg support 30 is adjustable, the leg support 30 may include one or more latching or locking features 176 configured to retain the leg support 30 in the selected position. The leg support 30 may be operable between the storage position 32 and the support position 34 at any height. In certain aspects, the leg support 30 may be adjusted to a selected height when the leg support 30 is to be rotated to the storage position 32 to be most compact with the seat base 22 (e.g., positioning the connector 150 in the channel 156).

Figure 9:
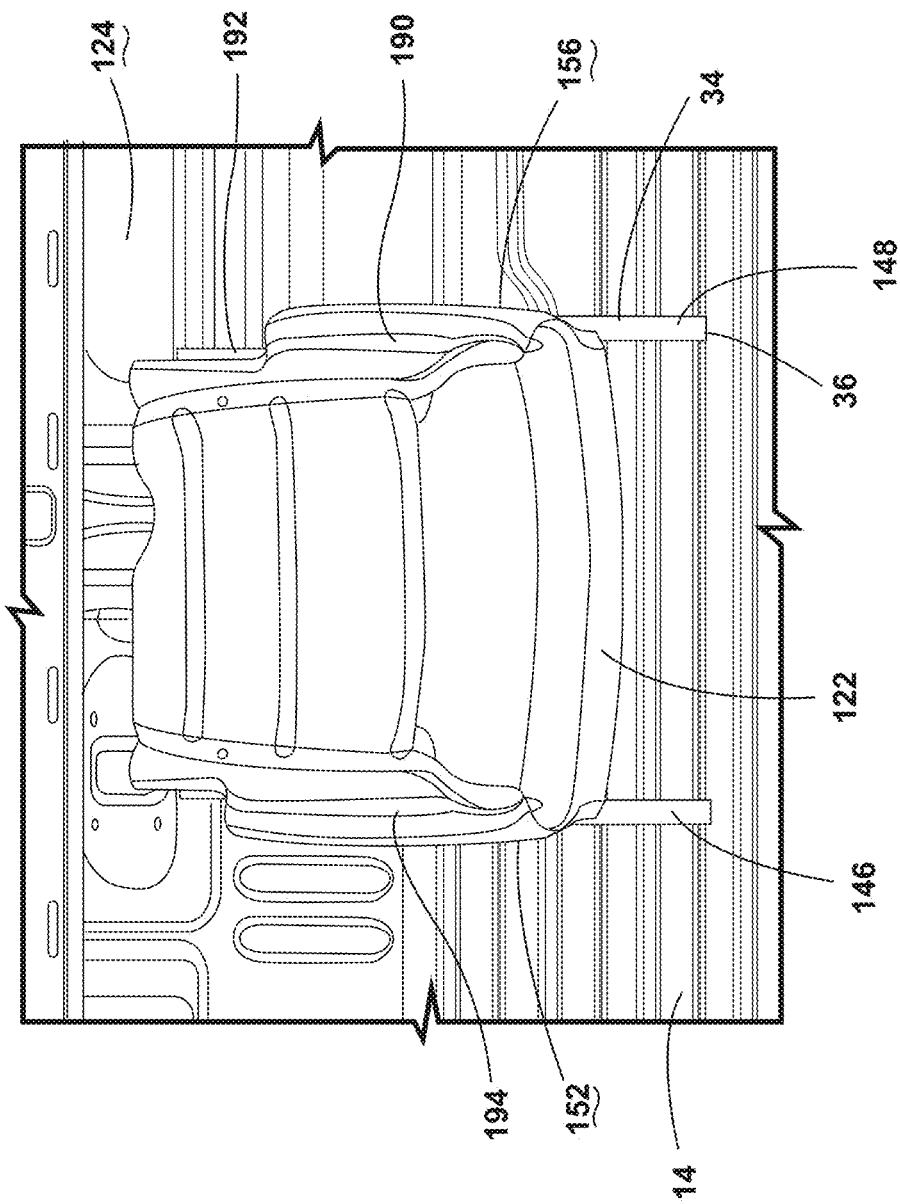
FIG. 9 is a top perspective view of a seating assembly of a vehicle seating system within a cargo space for use when the vehicle is in a stationary state, where a cushion is disposed on a seat base, according to the present disclosure.
Figure 10:
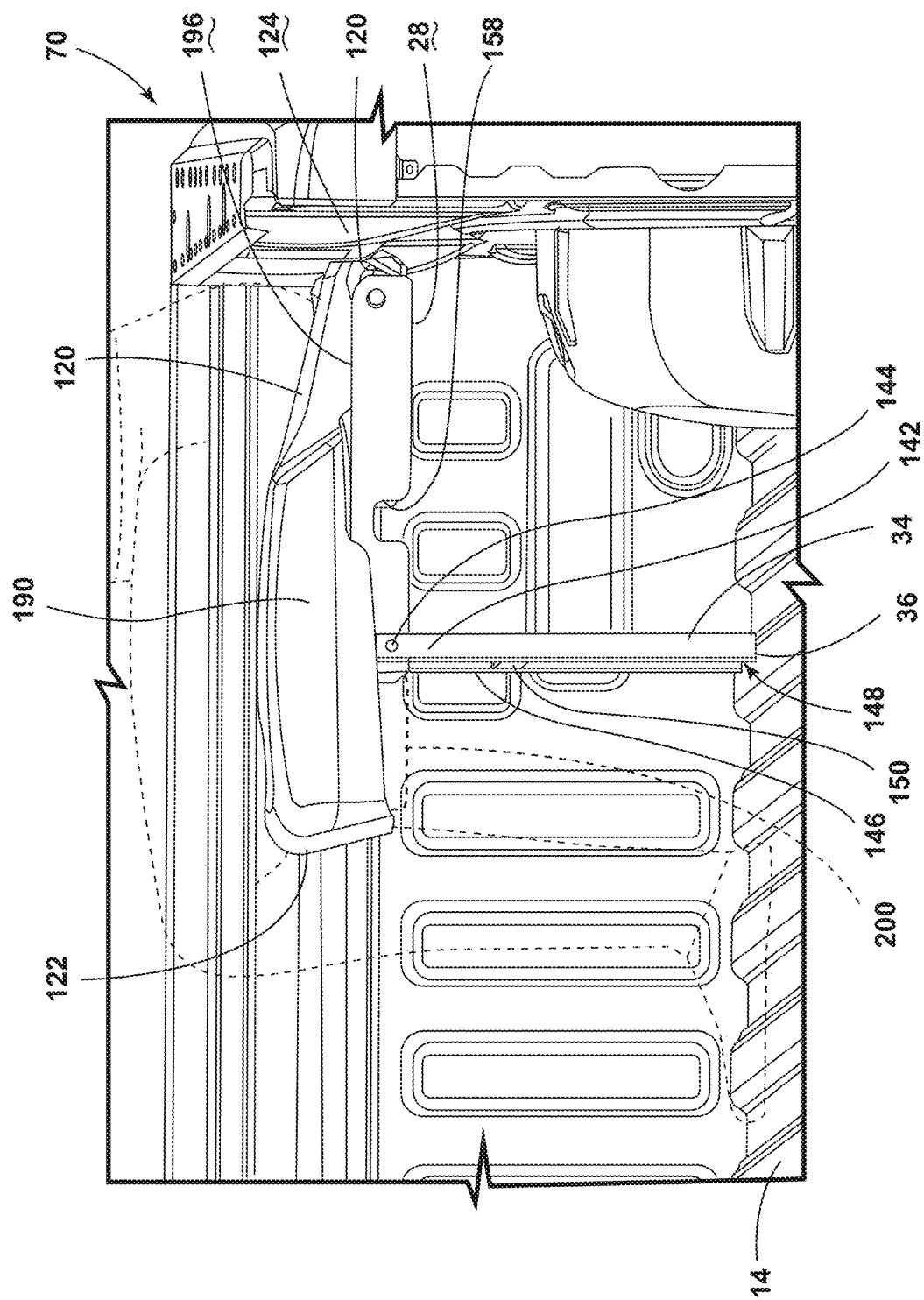
FIG. 10 is a side perspective view of a seating assembly of a vehicle seating system within a cargo space for use when the vehicle is in a stationary state, where a cushion is disposed on a seat base, according to the present disclosure.

Referring to FIGS. 9 and 10, the seating assembly 20 may include a cushion 190 selectively coupled to the seat base 22. The cushion 190 may include a center padding 192, such as foam or other deformable material, and a cover 194. The cushion 190 is generally disposed on a support surface 196 of the seat base 22 to provide additional support and comfort for the passenger. The cover 194 is generally constructed of durable, all-weather material to withstand different weather events when positioned on the exterior seating assemblies 20.

The cushion 190 is generally configured to be engaged with the seat base 22 when the seat base 22 is in either or both of the stowed position 24 and the deployed position 26. Accordingly, the cushion 190 does not substantially impinge on the rotational movement of the seat base 22 or the movement of the leg support 30. The cushion 190 may be coupled to the seat base 22 or elsewhere on the seating assembly 20 at one or multiple locations. For example, the cushion 190 may hook or otherwise coupled to the proximal end 120 of the seat base 22. Additionally or alternatively, the cushion 190 may be configured to couple to the support feature 18. In additional non-limiting examples, the cushion 190 may be configured to couple to the bottom surface 28, the side surfaces 152, 154, and/or the distal end 122 of the seat base 22. The cushion 190 may include hooks, ties, clips, snap features, or other coupling members to engage the seating assembly 20. In various aspects, the cushion 190 and the seat base 22 may include mating or interlocking features to couple the cushion 190 to the seat base 22.

Referring still to FIGS. 9 and 10, the cushion 190 may be configured to couple to components within the passenger compartment 50 (FIG. 1) and be selectively moved between the interior seats and the exterior seating system 70. In certain aspects, the cushion 190 may be a component of or coupled to the interior seat and be configured to be removed therefrom. This configuration provides a manner for storing the cushions 190 when the cushions 190 are disengaged from the seating assemblies 20 in the cargo space 14. This configuration also allows flexibility in using the cushions 190 both within the passenger compartment 50 (FIG. 1) and the cargo space 14. As disclosed herein, currently, all modern OEMs warn occupants against sitting in the bed of a pickup truck while the vehicle 10 is moving due to safety concerns. Such OEMs may consider and/or implement lockout technology to prevent occupants from sitting in the bed of the pickup truck while the vehicle 10 is moving. However, it is anticipated that technology and the regulatory framework may evolve in the future to where such an activity is safe and permissible.

As best illustrated in FIG. 10, the cushion 190 may be larger than the seat base 22 to provide additional support or comfort for the passenger for use while the vehicle 10 is stationary or in compliance with the current OEM warnings, technology, and regulatory framework. In such examples, the cushion 190 may include internal support structures for supporting the passenger where the cushion 190 extends beyond the seat base 22. Additionally or alternatively, the seat base 22 may include an extension 200 configured to extend the size of seat base 22. The extension 200 may be configured to adjust from a first position, beneath or within the seat base 22, to a second position, at least partially extending from the seat base 22. The second position may be a side position relative to the seat base 22 (e.g., in the fore-aft direction) to widen the seat base 22 or a front position (e.g., toward the opposing sidewall 16) to lengthen the seat base 22. The extension 200 may then provide support for the larger cushion 190. The extension 200 may be advantageous for increasing the seating space provided by the seating assembly 20.

Figure 11:
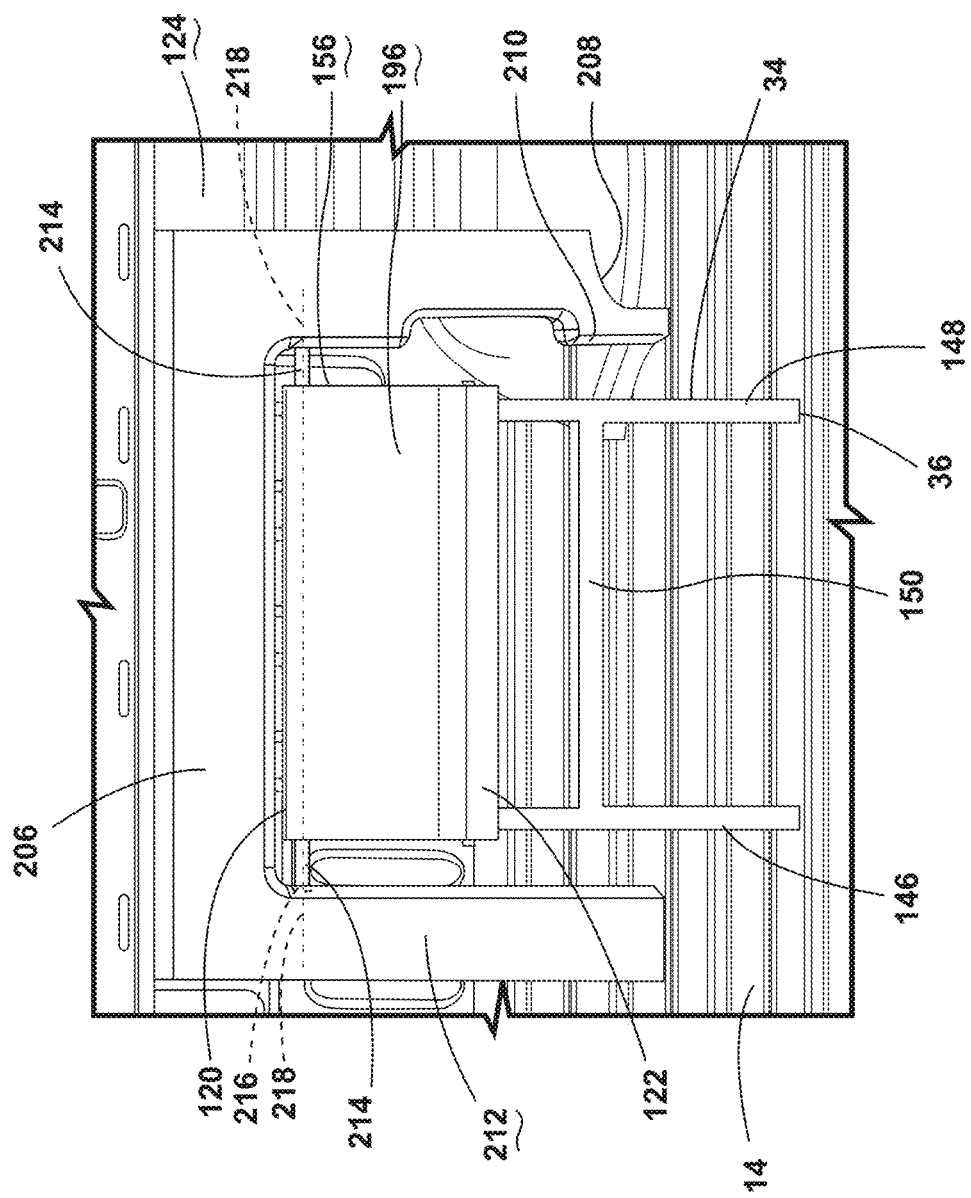
FIG. 11 is a top perspective view of a seating assembly of a vehicle seating system within a cargo space for use when the vehicle is in a stationary state, where a seat base is coupled to a frame disposed adjacent to a sidewall, according to the present disclosure.
Figure 12:
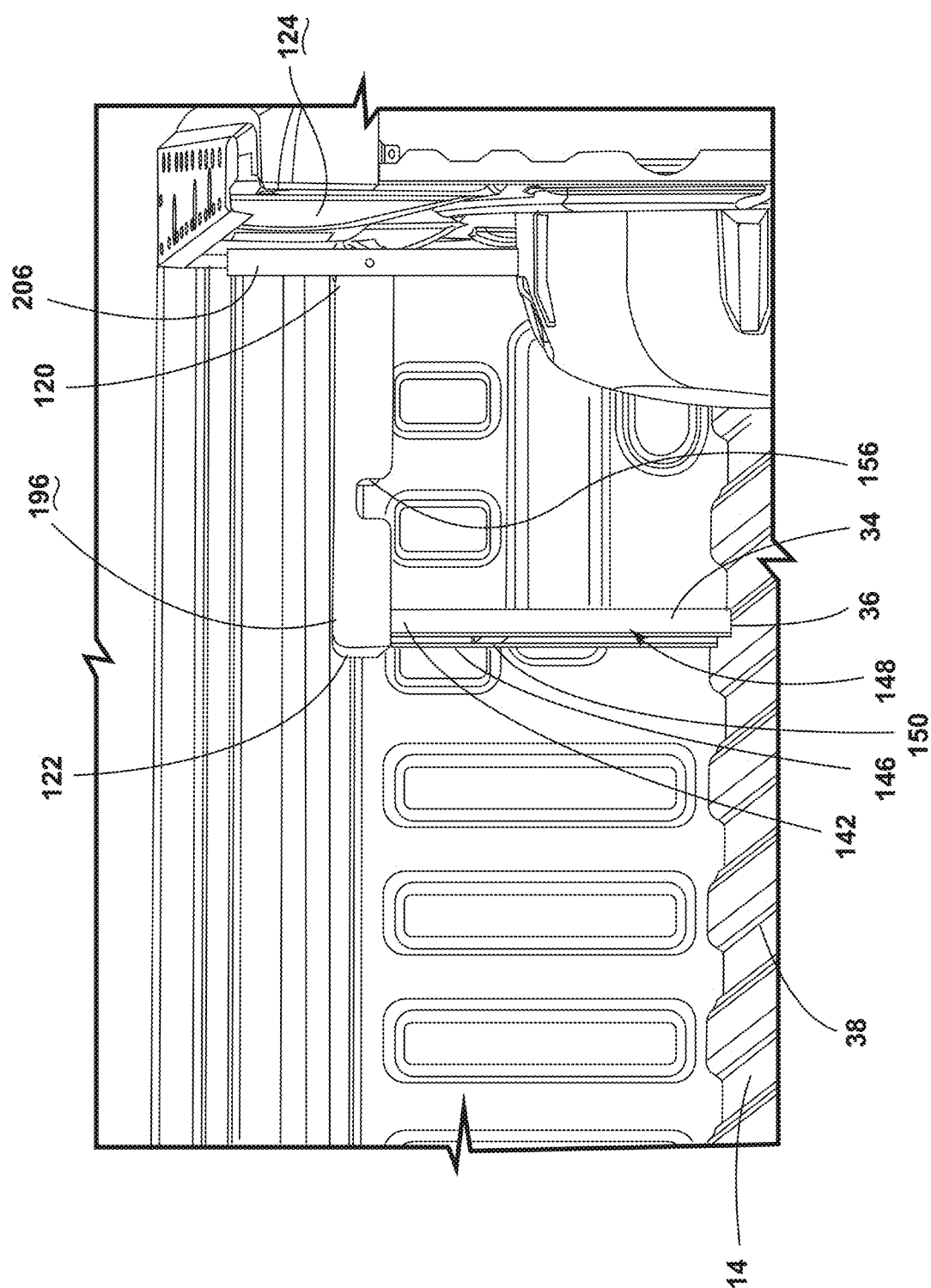
FIG. 12 a side elevation view of a seating assembly of a vehicle seating system within a cargo space for use when the vehicle is in a stationary state, where a seat base is coupled to a frame disposed adjacent to a sidewall, according to the present disclosure.

Referring to FIGS. 11 and 12, the seating system 70 may also include a frame 206 or multiple frames 206 coupled to the sidewalls 16 proximate to the seating assemblies 20. When the seat base 22 is in the stowed position 24, the seat base 22 may abut, yet protrude slightly from the inner surface 124 of the first sidewall 52. The frames 206 are configured to be disposed adjacent to the sidewalls 16 to provide more uniform side surfaces in the cargo space 14 when the seat bases 22 are in the stowed position 24.

In the example illustrated in FIGS. 11 and 12, the frame 206 abuts the sidewall 16 adjacent to the respective wheel housing 90, 92 and defines a notch 208 for receiving a portion of the wheel housing 90, 92. Additionally or alternatively, the frame 206 may be disposed adjacent to and not extend at least partially over the wheel housing 90, 92. The frame 206 defines a receiving aperture 210 configured to receive the seat base 22 when the seat base 22 is in the stowed position 24. When in the stowed position 24, the support surface 196 of the seat base 22 may generally align with a front surface 212 of the frame 206, providing a more uniform surface along the sidewall 16 adjacent to the wheel housing 90, 92. The frame 206 may be advantageous for protecting the seat base 22. Additionally, the frame 206 may assist the user with avoiding contact with the side surfaces 152, 154 of the seat bases 22 when loading, unloading, or moving items within the cargo space 14.

The seat base 22 may be coupled to the frame 206. In certain aspects, the frame 206 is coupled to the sidewall 16 and the seat base 22 is selectively coupled to the frame 206.

In additional or alternative examples, the frame 206 may be included as part of the seating assembly 20, such that the seat base 22 and the frame 206 are part of a single unit. In such examples, the frame 206 may be coupled to the support feature 18 or the sidewall 16, or alternatively may be supported by the engagement between the seat base 22 and the support feature 18.

In examples, with the frame 206, the seat base 22 includes pivot members 214 extending in opposing directions (the fore-aft directions) from the proximal end 120 of the seat base 22. The pivot members 214 rotatably engage the frame 206, allowing the seat base 22 to rotate relative to the frame 206. The frame 206 may define apertures or recesses 216 to receive the pivot member 214. It is also contemplated that the frame 206 may include the pivot members 214 that engage apertures or recesses 216 of the seat base 22 without departing from the teachings herein. The seat base 22 is configured to rotate about a rotational axis 218 defined by the pivot members 214.

Referring still to FIGS. 11 and 12, the illustrated configuration includes the frame 206 on a single side of the wheel housing 90, 92 with a single receiving aperture 210. Each seating assembly 20 may be associated with an individual frame 206, such that there can be the same number of seating assemblies 20 and frames 206. In additional or alternative examples, the seating system 70 may include two frames 206, with a single frame 206 for each sidewall. In such examples, the frames 206 each extend the length of the cargo space 14 from proximate the cabin wall 56 to proximate the tailgate 58 (FIG. 1). The frames 206 may each define the notch 208 to receiving the wheel housings 90, 92, respectively, as well as one receiving aperture 210 on each side of the wheel housings 90, 92 to receive the seating assemblies 20 coupled to the same sidewall 16.

As illustrated in FIGS. 11 and 12, the leg support 30 may be coupled to the bottom surface 28 of the seat base 22. The seat base 22 may define cavities or additional channels 156 for receiving a substantial portion or all of the leg support 30 when the leg support 30 is in the storage position 32. In this configuration, the leg support 30 is generally contained within the seat base 22 when in the storage position 32, which may be advantageous for protecting corners and surfaces of the leg support 30. The leg support 30 being concealed within the seat base 22 may increase the longevity of the leg support 30, as well prevent items such as netting, string, tie down, cord, etc. from catching on the exposed leg support 30. Moreover, the user may move the seating assembly 20 by grasping the seat base 22 rather than the leg support 30. When the leg support 30 is stored in the seat base 22, the seat base 22 may be wider to cover the leg support 30. Additionally or alternatively, the leg support 30 may be narrower to fit within the seat base 22 without departing from the teachings herein.

Figure 13:
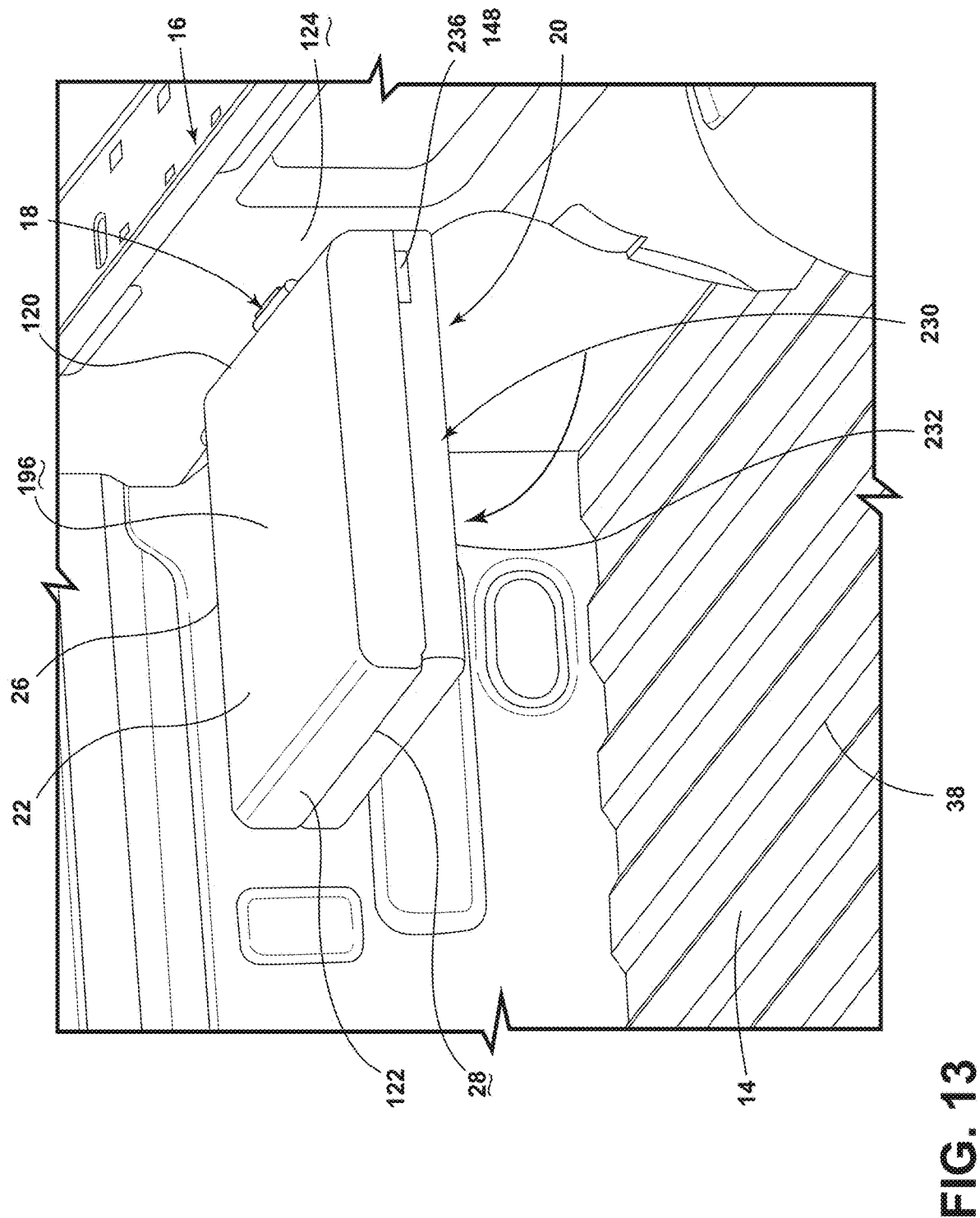
FIG. 13 is a side perspective view of a seating assembly of a vehicle seating system within a cargo space for use when the vehicle is in a stationary state, where a seatback is in a storing position, according to the present disclosure.
Figure 14:
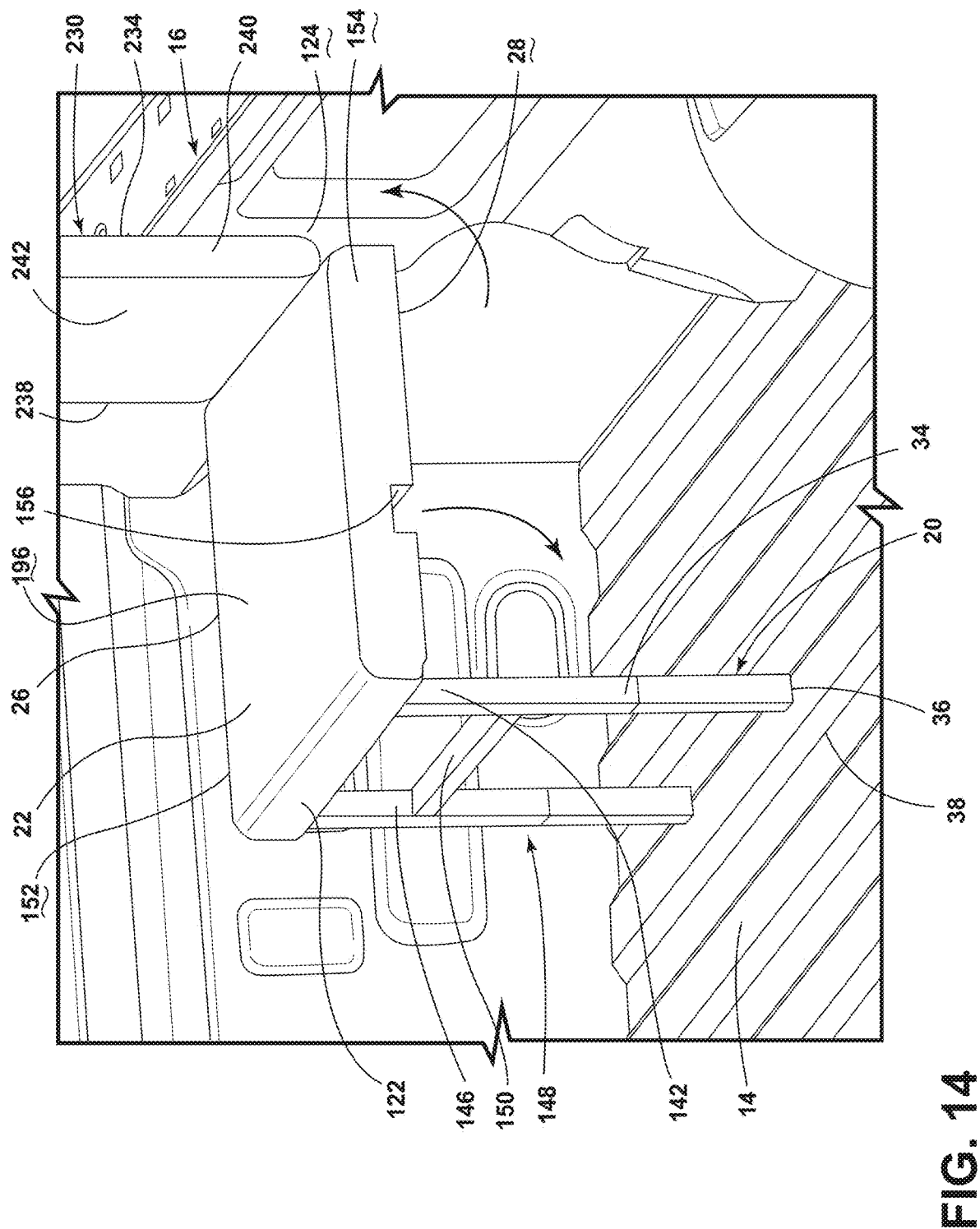
FIG. 14 is a side perspective view of a seating assembly of a vehicle seating system within a cargo space for use when the vehicle is in a stationary state, where a seatback is in a supporting position, according to the present disclosure.

Referring to FIGS. 13 and 14, in various examples, the seating assemblies 20 may include a seatback 230. The seatback 230 may be selectively coupled to the seat base 22, such that the seatback 230 may be removable. In such examples, the seatback 230 may couple with the seat base 22 and/or the support feature 18 via hooks, clips, supports in receiving holes, etc. Additionally or alternatively, the seatback 230, the seat base 22, and the leg portion 30 may be a single unit.

The seatback 230 may be rotatably coupled to the proximal end 120 of the seat base 22. The seatback 230 is generally operable between a storing position 232, abutting the seat base 22, and a supporting position 234, extending upwards from the seat base 22 to support the passenger. In certain aspects, the seatback 230 may rest against the support surface 196 of the seat base 22 when in the storing position 232. The seatback 230 may then rotate away from the support surface 196 to the supporting position 234 for use by the passenger when the vehicle 10 is stationary and/or in compliance with the current OEM warnings, technology, and regulatory framework.

In an additional or alternative example, the seatback 230 is configured to abut the bottom surface 28 of the seat base 22 when in the storing position 232. In this configuration, when the seatback 230 is in the storing position 232, the leg support 30 is configured to extend between the seat base 22 and the seatback 230 when the leg support 30 is in the storage position 32. This configuration may assist in securing the leg support 30 in the storage position 32 and may also be configured to lock the leg support 30 in the storage position 32. The seat base 22 is configured to rotate between the stowed position 24 and the deployed position 26 without the leg support 30 or the seatback 230 moving or impinging on the movement of the seat base 22.

The leg support 30 may be coupled to the bottom surface 28 and stored within the seating assembly 20 when the leg support 30 is in the storage position 32. This may provide a compact storage arrangement for the leg support 30, concealing the leg support 30 within the seating assembly 20. It is also contemplated that the leg support 30 may be coupled to the outer surfaces 152, 154 of the seat base 22 without departing from the teachings herein.

Referring to FIGS. 13 and 14, the seatback 230 may be able to rotate to the storing position 232 abutting the support surface 196 and the storing position 232 abutting the bottom surface 28 of the seat base 22. This may provide increased flexibility and arrangements for the seating system 70. For example, the storing position 232 with the seatback 230 abutting the bottom surface 28 may also allow the passenger to utilize the seating assembly 20 without the seatback 230. In such examples, the seatback 230 may be rotated away from the seat base 22 to move the leg support 30 from the storage position 32 to the support position 34, and then the seatback 230 may be moved back to the storing position 232.

The seatback 230 is generally configured to rotate in a range between about 90 degrees and about 270 degrees. It is also contemplated that the seatback 230 may rotate about 360 degrees to rest on the support surface 196 and abut the bottom surface 22 of the seat base 22 without departing from the teachings herein. At least one of the seatback 230 and the seat base 22 may include at least one retaining member 236 to retain the seatback 230 in the storing position 232 and/or the supporting position 234. Further, the seatback 230 may rest against the sidewall 16 for support when in the supporting position 234 for use when the vehicle 10 is stationary and/or in compliance with the current OEM warnings, technology, and regulatory framework.

Referring still to FIGS. 13 and 14, the seatback 230 may be rotated to the supporting position 234 prior to the seating assembly 20 being coupled to the sidewall 16. Additionally or alternatively, the seatback 230 may be configured to rotate or move to the supporting position 234 when the seat base 22 is coupled to the sidewall 16. In such examples where seatback 230 is abutting the bottom surface 28 in the storing position 232, a rotational path of the seatback 230 may move around the support feature 18 and the sidewall 16. For example, the seatback 230 may be coupled to the seat base 22 proximate one of the side surfaces 154 and rotate sideways around the side surface 154 to be disposed proximate to the support surface 196 of the seat base 22. In this way, the seatback 230 may rotate along a plane generally parallel to the sidewall 16. The seatback 230 may also include a latch to secure the seatback 230 to the seat base 22 once the seatback 230 has been moved to the supporting position 234.

The seatback 230 may have any practicable configuration. In the illustrated example, the seatback 230 includes sides 238, 240 with a connecting support 242 extending therebetween. The connecting support 242 may be a flexible material, such as fabric, for supporting the passenger. Additionally or alternatively the connecting support 242 may include a cushion or may have a cushion coupled thereto.

Referring still to FIGS. 13 and 14, the seatback 230 and the seat base 22 may be configured to form a cavity when the seatback 230 is in the storing position 232. For example, the cavity may be defined at least partially by the bottom surface 28 of the seat base 22. The leg support 30 may be disposed within the cavity when in the storage position 34. Additionally, the cavity may be utilized for storing items. In this way, the seatback 230 is configured to operate as a lid that mates with the seat base 22 to form a box-like storage feature. The box-like storage feature may provide for flat stowage of the seating assembly 20 while providing additional storage space.

Referring to FIGS. 1-14, the seating system 70 may provide for multiple seating arrangements within the cargo space 14 of the vehicle 10. All modern OEMs of passenger vehicles 10 currently warn occupants against sitting in the bed of a pickup truck while the vehicle 10 is moving due to safety concerns. However, it is anticipated that technology and the regulatory framework may evolve in the future to where such an activity is safe and permissible. In the illustrated example, the seating system 70 includes four seating assemblies 20, with two seating assemblies 20 coupled to the first sidewall 52 on opposing sides of the first wheel housing 90 and two additional seating assemblies 20 coupled to the second sidewall 54 on opposing sides of the second wheel housing 92. Additional or fewer seating assemblies 20 may be included in the seating system 70 without departing from the teachings herein.

The seating assemblies 20 may remain engaged with the respective sidewall 16 or may be removably coupled with the sidewalls 16. In examples where the seating assemblies 20 are removably coupled with the sidewalls 16, the seat seating assemblies 20 may selectively engage the support feature 18 or may be included in the same unit as the support feature 18, which is configured to engage at least one mounting bracket 100 on the sidewall 16. The mounting brackets 100 provide a uniform mounting point in the cargo space 14, which supports various accessories, including the seating system 70. Accordingly, seating assemblies 20 may be added or removed from the cargo space 14 based on the selected arrangement for the user.

One or more of the seating assemblies 20 may be coupled with the frame 206 and/or include the cushion 190. The seating system 70 includes seating assemblies 20 that include at least one of the cushion 190, the frame 206, and the seatback 230. Moreover, one or more of the seating assemblies 20 may include the leg support 30 that extends proximate to the side surfaces 154, 156 of the seat base 22 when in the storage position 32, as best illustrated in FIGS. 4-10, or the leg support 30 that extends into or inside of the seat base 22 when in the storage position 32, as best illustrated in FIGS. 11-14. The different positions of the leg support 30 may each be utilized with the cushion 190, the frame 206, and/or the seatback 230.

The seating system 70 is illustrated in the bed of the pickup truck. The seating system 70 may be used in compliance with the current OEM warnings, technology, and regulatory framework. While, all modern OEMs of passenger vehicles 10 currently warn occupants against sitting in the bed of a pickup truck while the vehicle 10 is moving due to safety concerns, it is anticipated that technology and the regulatory framework may evolve in the future to where such an activity is safe and permissible. OEMs that warn against such an activity may consider and/or implement lockout mechanisms to prevent such an activity.

Use of the present device or system may provide for a variety of advantages. For example, the seating system 70 may provide additional seating options within the cargo space 14 of the vehicle 10 for use when the vehicle 10 is stationary and/or in compliance with the current OEM warnings, technology, and regulatory framework. The additional seating options may be exterior seating options, for example, in the truck bed. Additionally, the seating system 70 may include one or more of the seating assemblies 20, cushions 190, and the frames 206. Further, the seating system 70 provides flexible seating options with multiple arrangements possible with the various components. Also, the seating assemblies 20 may be selectively added and removed from the cargo space 14 or may be retained in the cargo space 14 of the seating system 70. Moreover, the seating assemblies 20 are operable between the stowed position 24 and the deployed position 26 for continued use of the seating system 70 over time without removing the seating assemblies 20 after each use. Additionally, when the seating assemblies 20 are in the stowed position 24, the seating assemblies 20 are compact and abut the sidewalls 16 to maximize the storage area within the cargo space 14. Further, the seating system 70 utilizes the mounting brackets 100, which provides increased flexibility for the cargo space 14 as the mounting brackets 100 may be universal or common mounting points within the cargo space 14. Additional benefits or advantages may be realized and/or achieved.

According to various examples, a vehicle includes a body defining a cargo space. The body includes at least one sidewall that partially defines the cargo space. Support features are coupled to the at least one sidewall. Seating assemblies are coupled to the support features in the cargo space. Each of the seating assemblies includes a seat base operable between a stowed position and a deployed position. A bottom surface of the seat base is disposed adjacent to the at least one sidewall when the seat base is in the stowed position. Each of the seating assemblies also includes a leg support operably coupled to the seat base. The leg support is operable between a storage position and a support position. An end of the leg support is disposed proximate to the seat base when in the storage position and configured to engage a floor of the cargo space when in the support position. Embodiments of the present disclosure may include one or a combination of the following features:

the cargo space is a truck bed;
the at least one sidewall includes a first sidewall and a second sidewall opposing the first sidewall;
the first sidewall defines a first wheel housing and the second sidewall defines a second wheel housing;
two of the seating assemblies are coupled to the first sidewall on opposing sides of the first wheel housing;
two of the seating assemblies are coupled to the second sidewall on opposing sides of the second wheel housing;
a frame coupled to the at least one sidewall proximate to a wheel housing;

the seat base includes pivot members configured to rotatably engage the frame;

the frame defines a receiving aperture configured to receive the seat base when the seat base is in the stowed position;

a support surface of the seat base aligns with a front surface of the frame when the seat base is disposed in the stowed position;

the leg support is rotatably coupled to a distal end of the seat base;

the leg support includes leg portions coupled via a connector; and the bottom surface of the seat base defines a channel for receiving the connector when the leg support is in the storage position.

According to various examples, a seating system for a vehicle includes a sidewall at least partially defining a cargo space. The sidewall defines a wheel housing. A first support feature is coupled to the sidewall on a first side of the wheel housing. A second support feature is coupled to the sidewall on a second side of the wheel housing. A first seating assembly is selectively coupled to the first support feature. A second seating assembly is selectively coupled to the second support feature. Each of the first seating assembly and the second seating assembly includes a seat base rotatable between a stowed position and a deployed position. The seat bases extend along a surface of the sidewall when in the stowed position. Each of the first seating assembly and the second seating assembly also includes a leg support coupled to the seat base. The leg supports are operable between a storage position and a support position. Embodiments of the present disclosure may include one or a combination of the following features:

the seat bases and the leg supports are each disposed parallel to the sidewall when the seat bases are in the stowed position;

the seat bases are disposed perpendicular to the sidewall when in the deployed position;

the seat bases of the first seating assembly and the second seating assembly each define a channel in a bottom surface thereof to receive the respective leg supports when the leg supports are in the storage position;

a cushion selectively coupled to the seat base of at least one of the first seating assembly and the second seating assembly;

the leg supports are operable between nested positions and extended positions to adjust lengths of the leg supports;

the leg portions are coupled to a distal end of the seat bases, respectively, and wherein each leg support is configured to rotate between the storage position and the support position; and each leg support is configured to slide from the storage position to an intermediate position and rotate between the intermediate position and the support position.

According to various examples, a vehicle seating system includes a support feature coupled to a sidewall within a cargo space of a vehicle. A seating assembly is coupled to the support feature. The seating assembly is rotatable between a stowed position and a deployed position. The seating assembly includes a seat base having a proximal end coupled to the support feature and a distal end. The distal end of the seat base is disposed adjacent to the sidewall in the stowed position. The seating assembly also includes a leg support coupled to the distal end of the seat base. The leg support is operable between a storage position and a support position. Embodiments of the present disclosure may include one or a combination of the following features:

a bottom surface of the seat base is disposed adjacent to the sidewall when the seat base is in the stowed position;

a frame coupled to the sidewall;

the frame defines a receiving aperture for receiving the seat base when the seat base is in the stowed position;

the leg support is configured to telescope between a nested position and an extended position to adjust a length of the leg support; and the seating assembly includes a coupling feature configured to selectively engage and disengage from the support feature.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
a body defining a cargo space, wherein the body includes at least one sidewall at least partially defining the cargo space;
support features coupled to the at least one sidewall;
seating assemblies coupled to the support features in the cargo space, wherein each of the seating assemblies includes:
a seat base operable between a stowed position and a deployed position, wherein a bottom surface of the seat base is disposed adjacent to the at least one sidewall when the seat base is in the stowed position, and wherein a bottom surface of the seat base defines a channel that is recessed into the seat base; and
a leg support operably coupled to the seat base, wherein the leg support is operable between a storage position and a support position, wherein an end of the leg support is disposed proximate to the seat base when in the storage position and configured to engage a floor of the cargo space when in the support position, and wherein at least a portion of the leg support is disposed in the channel to contain at least the portion of the leg support in the seat base when the leg support is in the storage position; and
a frame coupled to the at least one sidewall proximate to a wheel housing, wherein the seat base of at least one of the seating assemblies includes pivot members configured to rotatably engage the frame, and wherein the frame defines a receiving aperture configured to receive the seat base of the at least one of the seating assemblies when the seat base is in the stowed position, and further wherein a support surface of the seat base of the at least one of the seating assemblies aligns with a front surface of the frame when the seat base is disposed in the stowed position.

2. The vehicle of claim 1, wherein the cargo space is a truck bed.

3. The vehicle of claim 1, wherein the at least one sidewall includes a first sidewall and a second sidewall opposing the first sidewall, and wherein the first sidewall defines a first wheel housing and the second sidewall defines a second wheel housing.

4. The vehicle of claim 3, wherein two of the seating assemblies are coupled to the first sidewall on opposing sides of the first wheel housing, and wherein two of the seating assemblies are coupled to the second sidewall on opposing sides of the second wheel housing.

5. The vehicle of claim 1, wherein for each of the seating assemblies the leg support is rotatably coupled to a distal end of the seat base, respectively.

6. The vehicle of claim 1, wherein for each of the seating assemblies the leg support includes leg portions coupled via a connector, and wherein for each of the seating assemblies the channel extends between opposing side surfaces of the seat base for receiving the connector when the leg support is in the storage position, respectively.

7. A seating system for a vehicle, comprising:
a sidewall at least partially defining a cargo space, wherein the sidewall defines a wheel housing;
a first support feature coupled to the sidewall on a first side of the wheel housing;
a second support feature coupled to the sidewall on a second side of the wheel housing;
a first seating assembly selectively coupled to the first support feature; and
a second seating assembly selectively coupled to the second support feature, wherein each of the first seating assembly and the second seating assembly include:
a seat base rotatable between a stowed position and a deployed position, wherein the seat base extends along a surface of the sidewall when in the stowed position; and
a leg support coupled to the seat base, wherein the leg support is operable between a storage position and a support position, and wherein each leg support is configured to slide from the storage position to an intermediate position and rotate between the intermediate position and the support position.

8. The seating system of claim 7, wherein the seat bases and the leg supports are each disposed parallel to the sidewall when the seat bases are in the stowed position, and wherein the seat bases are disposed perpendicular to the sidewall when in the deployed position.

9. The seating system of claim 7, wherein the seat bases of the first seating assembly and the second seating assembly each define a channel in a bottom surface thereof to receive the respective leg supports when the leg supports are in the storage position.

10. The seating system of claim 7, further comprising:
a cushion selectively coupled to the seat base of at least one of the first seating assembly and the second seating assembly.

11. The seating system of claim 7, wherein the leg supports are operable between nested positions and extended positions to adjust lengths of the leg supports.

12. A vehicle seating system, comprising:
a support feature coupled to a sidewall within a cargo space of a vehicle; and
a seating assembly coupled to the support feature, wherein the seating assembly is rotatable between a stowed position and a deployed position, wherein the seating assembly includes:
a seat base having a proximal end coupled to the support feature and a distal end, wherein the distal end of the seat base rotates toward the sidewall to the stowed position for a bottom surface of the seat base to face the sidewall;
a leg support coupled to the distal end of the seat base, wherein the leg support is operable between a storage position and a support position; and
a seatback operably coupled to the seat base, wherein the seatback is disposed between the bottom surface of the seat base and the sidewall in the stowed position.

13. The vehicle seating system of claim 12, wherein the bottom surface of the seat base is disposed adjacent to the seatback and the seatback is disposed adjacent to the sidewall when the seat base and the seatback are in the stowed position.

14. The vehicle seating system of claim 12, further comprising:
a frame coupled to the sidewall, wherein the frame defines a receiving aperture for receiving the seat base when the seat base is in the stowed position.

15. The vehicle seating system of claim 12, wherein the leg support is configured to telescope between a nested position and an extended position to adjust a length of the leg support.

16. The vehicle seating system of claim 12, wherein the seating assembly includes a coupling feature configured to selectively engage and disengage from the support feature.

17. The vehicle seating system of claim 12, wherein the leg support is coupled to the distal end of the seat base, and wherein the leg support is configured to rotate between the storage position and the support position.

18. The vehicle seating system of claim 12, wherein the leg support is disposed between the seat base and the seatback when the leg support is in the storage position and the seating assembly is in the stowed position.

19. The vehicle of claim 1, wherein each of the seating assemblies includes a cushion selectively coupled to the seat base, respectively.

20. The vehicle of claim 1, wherein the frame defines a notch to receive the wheel housing and a second receiving aperture, and wherein the receiving aperture and the second receiving aperture are disposed on each side of the wheel housing to receive two of the seating assemblies.

* * * * *